Nov. 19, 1957 — L. ARNETT — 2,813,965
BEVERAGE PREPARING AND DISPENSING APPARATUS
Original Filed Feb. 12, 1953 — 5 Sheets-Sheet 1

Inventor
Leslie Arnett

Nov. 19, 1957     L. ARNETT     2,813,965
BEVERAGE PREPARING AND DISPENSING APPARATUS
Original Filed Feb. 12, 1953     5 Sheets-Sheet 2
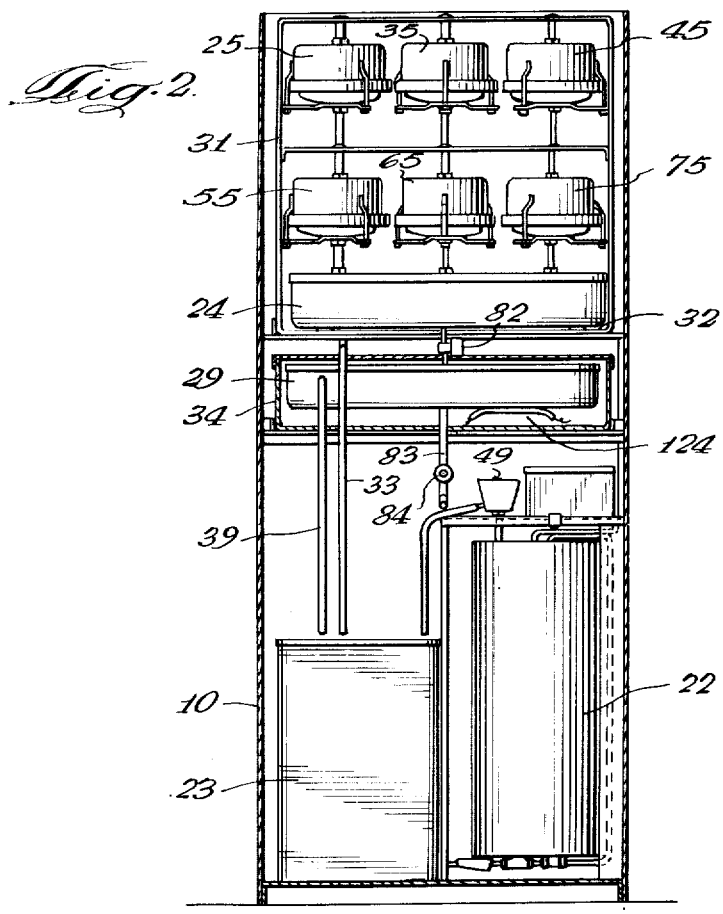
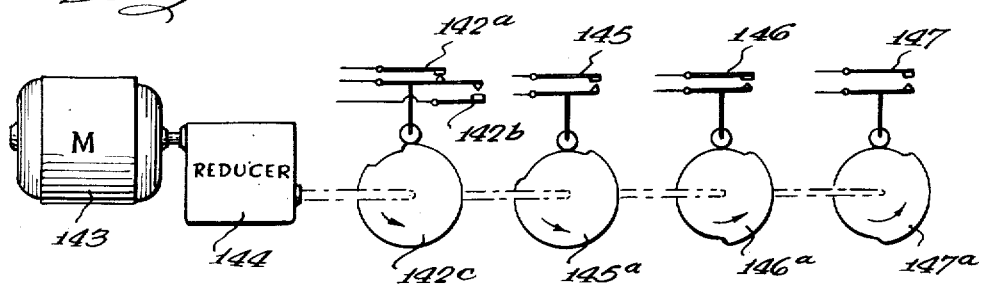

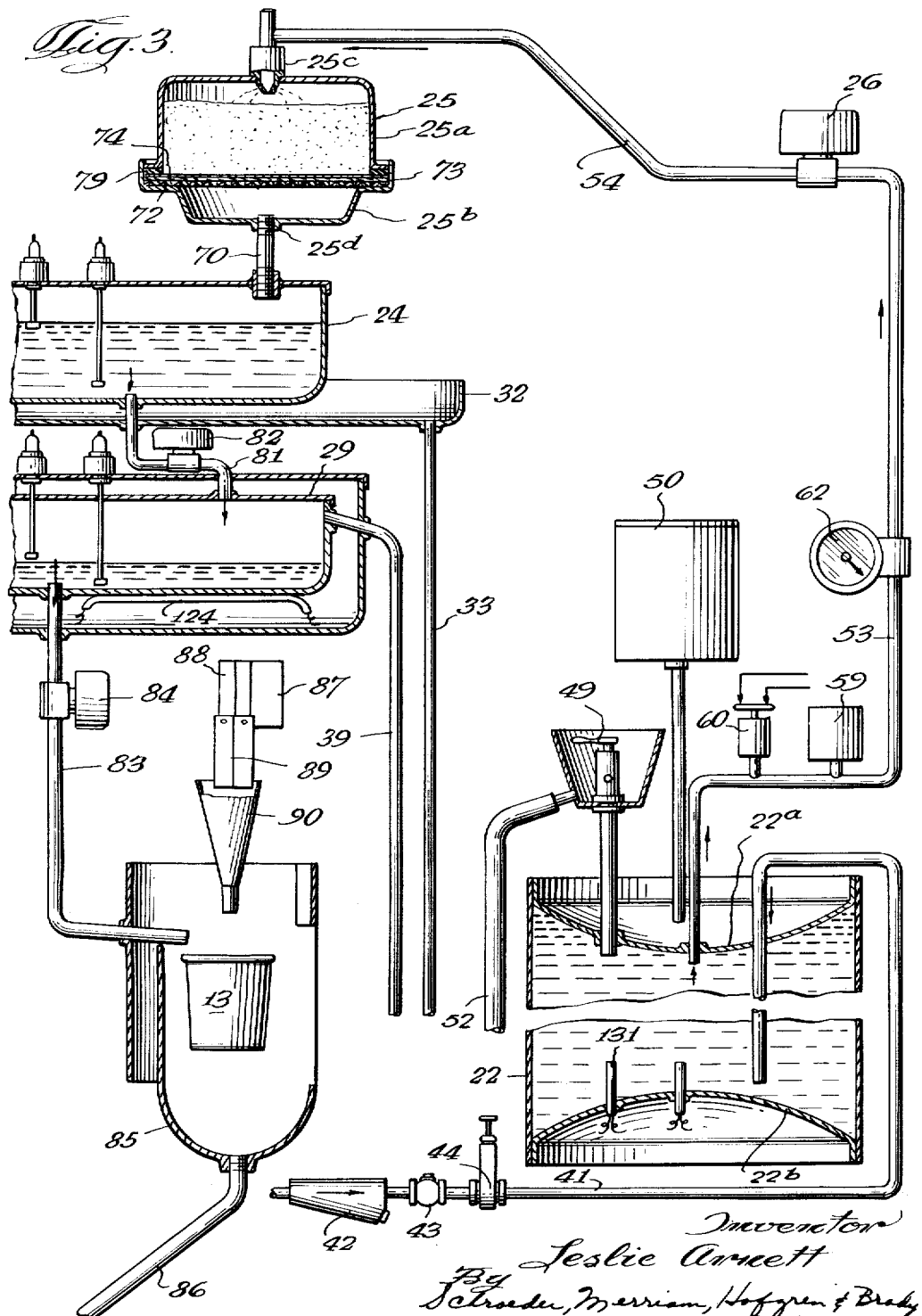

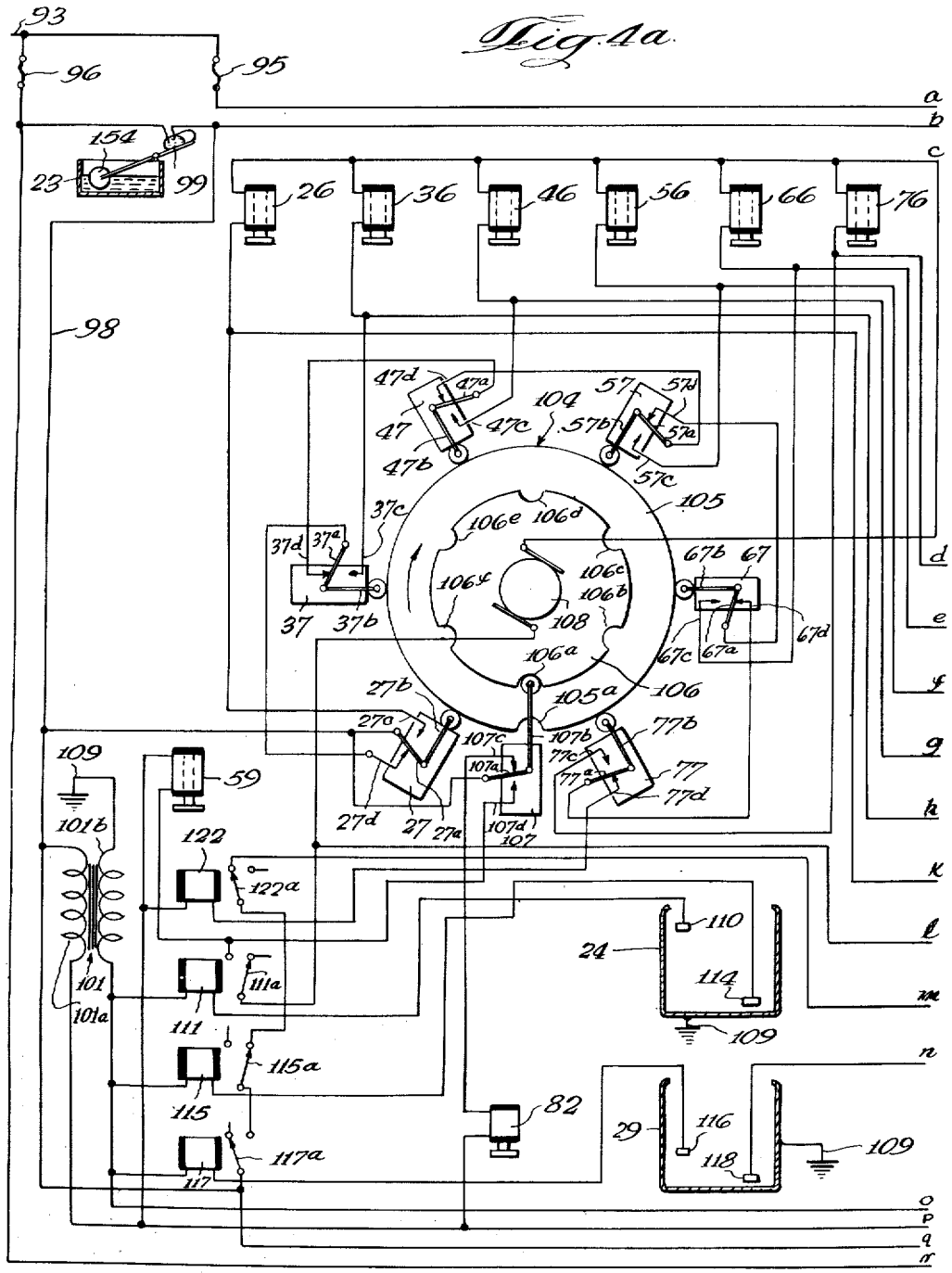

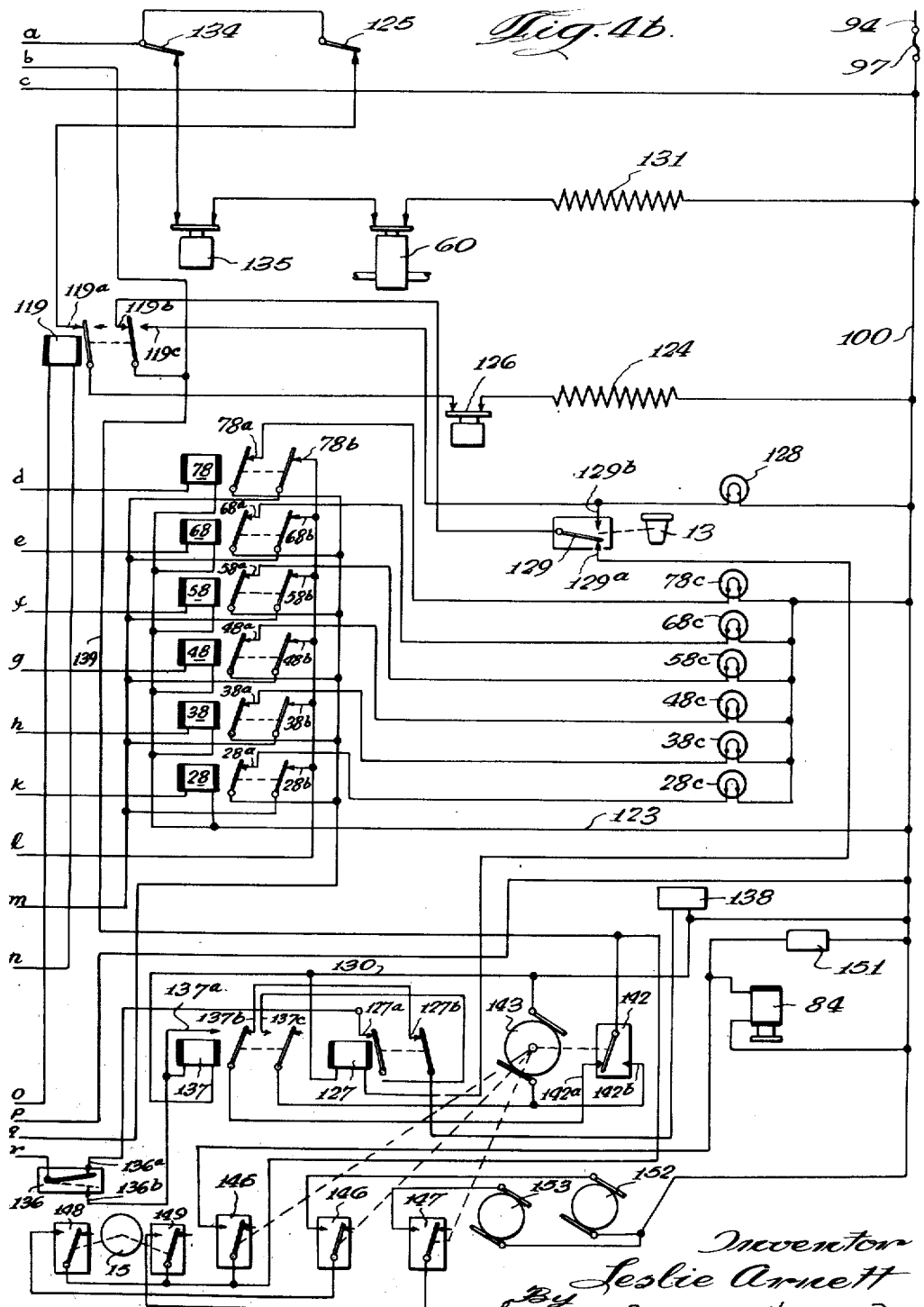

United States Patent Office

2,813,965
Patented Nov. 19, 1957

2,813,965
BEVERAGE PREPARING AND DISPENSING APPARATUS

Leslie Arnett, Chicago, Ill., assignor to United Coffee Corp., a corporation of Illinois Original application February 12, 1953, Serial No. 336,563, now Patent No. 2,761,200, dated September 14, 1956. Divided and this application May 7, 1953, Serial No. 353,621

2 Claims. (Cl. 219—38)

This invention relates to a beverage preparing and dispensing apparatus and more particularly to means for providing hot water in an apparatus which automatically brews and dispenses fresh coffee.

This application is a division of copending Arnett application Serial No. 336,563, filed February 12, 1953, issued as Patent 2,761,200, September 4, 1956, to which reference may be made for details of the mechanical structure and arrangement not fully described herein.

Beverage dispensers generally are well-known and there are coffee dispensers in use which mix powdered instant coffee with hot water for each individual cup dispensed. The quality of such coffee, however, is not as good as that of coffee brewed directly from the ground coffee bean. The inventions herein disclosed and claimed are in the means for providing hot water in an apparatus which brews coffee directly from the ground coffee bean in a desired quantity, stores and dispenses the brewed coffee, and brews a fresh batch of coffee when needed. It is to be understood that although the apparatus is described primarily in connection with coffee brewing it is equally well adapted for use in the brewing of other beverages such as tea and the like.

A prime feature of this invention is that it provides a new and improved apparatus for heating the liquid constituent of a beverage, in a beverage preparing and dispensing device. Another feature is that the means for providing the heated liquid comprises a tank connected to a source of liquid and having associated heating means, means responsive to the temperature of the liquid within the container for controlling the heating means, means responsive to the temperature and pressure within the container for venting the container, and means responsive to pressure within the container for controlling the heating means.

Another feature is that the venting means operates at a temperature higher than the temperature at which the temperature responsive means for controlling the heating means is actuated. A further feature is that the pressure means is arranged to deenergize the heating means when pressure of the liquid in the container reaches a predetermined point higher than the predetermined pressure which controls the venting means.

Further features and advantages will be readily apparent from the specification and from the drawings in which:

Figure 2 is a reduced front elevation view of the apparatus of Figure 1 with the front panel removed;

Figure 3 is a diagrammatic flow sheet illustrating the operation of the beverage brewer and dispenser;

Figure 4 (comprising portions 4a and 4b) is a schematic diagram of a control circuit for the beverage brewer and dispenser illustrating an embodiment of the invention; and Figure 5 is a diagrammatic view showing the cam controlled switches in the dispenser circuit.

Figure 1:
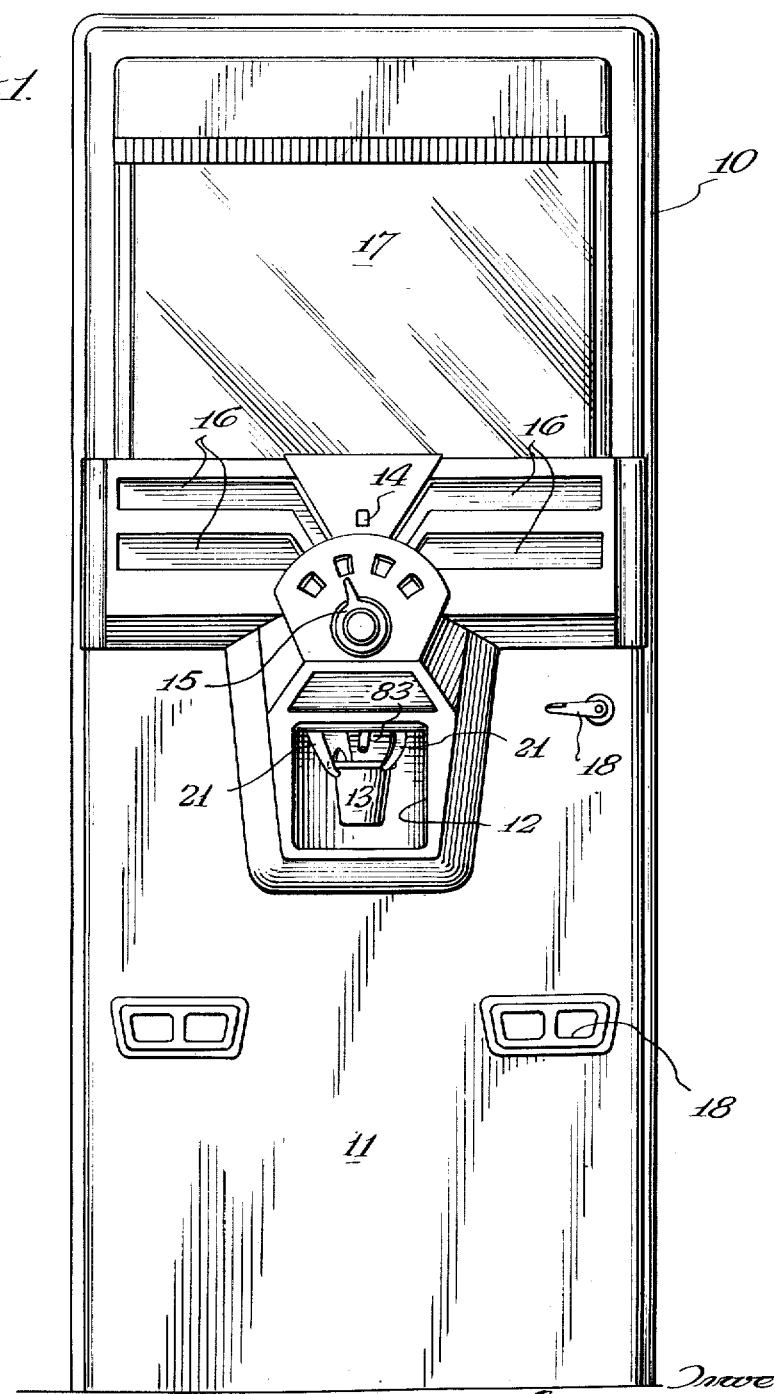
Figure 1 is a front elevation view of a beverage brewer and dispenser.

Referring now to the embodiment of the invention shown in the drawings, Figure 1 shows a beverage brewing and dispensing apparatus contained in a housing 10. A front panel 11 is hingedly mounted on the housing 10, providing access to the interior thereof. The front panel 11 has an access opening 12 therein, through which a customer may receive a cup 13 of beverage. A coin slot 14 is provided, through which a customer may insert a coin to initiate a dispensing operation. A selector 15, shown here as having four positions, is provided to enable a customer to choose the beverage desired as indicated on the panels 16. For example, the customer may select black coffee, coffee with cream, coffee with sugar, or coffee with cream and sugar, by appropriate operation of the selector mechanism, as will be more fully described later. The large panel 17 may contain an advertising display of some suitable nature. A coin return mechanism 18 permits return of the deposited coin when the machine is empty, or of bent or otherwise defective coins and slugs through the coin return slot 18a.

The cup 13 into which a serving of beverage is delivered is suspended within the access opening 12 by means of jaws 21. This eliminates the unsanitary spillage problem encountered in dispensing machines which have a shelf or platform on which the cup stands during the dispensing operation.

Figure 2 shows the arrangement of various elements of the system in the interior of the housing 10. In this view the front panel 11, which includes the access opening 12 and the cup holding jaws 21, has been removed, as has the cup dispensing mechanism which may be mounted in the upper left-hand portion of the housing. The cup dispensing mechanism (not shown herein) may be of any suitable type and reference may be had to the aforementioned co-pending Arnett application for details of the location and mounting of such mechanism. Included within the housing 10 are a water heater 22, a waste tank 23 and six brewing pots 25, 35, 45, 55, 65 and 75 (more or less may be used as desired). Storage means for the brewed coffee is provided and in this embodiment takes the from of a first or measuring tank 24, which is adapted to receive brewed beverage from the pots; and a second or dispensing tank 29, adapted to receive brewed beverage from the first tank. The second tank 29 is also referred to herein as a warming tank. The reason for and advantages of the two tank system will be apparent later.

The six brewing pots and the first storage tank are all mounted within an inner cabinet 31 in the upper portion of the housing 10. Any condensation from the brewing pots or from the first tank will collect in a drip pan 32 at the bottom of the cabinet and flow through drain pipe 33 into waste tank 23. The second tank 29 is mounted within a smaller cabinet 34 and is provided with an overflow pipe 39 which conducts any overflow from the second tank to the waste tank 23.

Referring now to Figure 3, water for brewing beverage is introduced under pressure to the apparatus from a water supply source such as a pressurized city water main, through an inlet or supply pipe 41. Inserted in the inlet pipe are a strainer 42, a check valve 43 and a pressure reducing valve 44. The inlet pipe extends through the top member 22a of the water heater 22 downward to a point near the bottom 22b thereof. Also associated with the water heater are a pressure and temperature actuated relief valve 49 and an air buffer tank 50. Any overflow from the relief valve 49 is carried through drain 52 to the waste tank 23. Pipe means are provided which carry heated water from the top of the tank 22 to the brewing pot 25. The pipe means as shown in Figure 3 includes outlet pipe 53 and pot pipe 54. Only one brewing pot is shown in Figure 3 rather than six pots as in Figure 2 to avoid unnecessarily complicating the drawing. Of course, any desired number of pots may be used.

The flow of water through the outlet pipe 53 is controlled by an electrically operated safety valve 59 and an electrically operated individual pot valve 26. Also associated with the outlet pipe 53 are a pressure operated switch 60 and a pressure indicator gauge 62. Similar pot pipes and pot valves are provided for each of the other brewing pots, 35, 45, 55, 65 and 75, as is shown more fully in the aforementioned co-pending Arnett application.

The brewing pots themselves are sealed, self-contained units having separable top and bottom portions 25a and 25b respectively, which are bolted together. Each of the pots contains a quantity of ground coffee, sufficient for brewing a predetermined quantity of beverage. The pots have threaded inlet and outlet fittings 25c and 25d respectively, by means of which they may be installed or removed from the apparatus without disturbing the pipe means. In practice, used pots will be removed from the machine by a serviceman and taken, along with pots from many other machines, to a central service station where they may be washed, sterilized and filled with fresh coffee for reuse.

If it is assumed that conditions are such that a brewing process is about to commence (the necessary conditions for this will be discussed later) the safety valve 59 and pot valve 26 in the pipe means will be opened, allowing heated water to flow from the heater 22 under the supply pressure. Preferably, the pressure is reduced to about 5 pounds per square inch by pressure reducing valve 44. The water will pass through pot pipe 54 and be sprayed into the interior of the pot 25. The heated water will percolate under pressure through the ground coffee 69, pass through the pot outlet pipe 70 and into the first tank 24.

The brewing pot 25 is provided with a filter made up of a supporting wire mesh 72, a sheet of filter cloth 73 and a sheet of filter paper 74, arranged in this order from bottom to top. The screen 72 and cloth 73 provide sufficient strength to prevent the paper 74 from being torn or ruptured by the pressure of the liquid passing therethrough. Any small particles of the ground coffee bean are filtered from the infusion by the filter paper 74 and the beverage passing into the storage tank may be stored indefinitely without becoming bitter. A gasket 79 may be provided to insure a perfect seal between the top and bottom portions 25a and 25b of the brewing pot.

The first or measuring tank 24 is connected to the second or dispensing tank 29 through a pipe 81 which is provided with measuring tank outlet valve 82. The measuring tank outlet valve 82 is closed during the brewing process to prevent the strong, first brewed beverage from entering the dispensing tank 29 before it has been diluted by mixing with the later infusion and to isolate the measuring tank during brewing to enable accurate measurement of the brewed beverage. When the brewing process has been completed, the measuring tank outlet valve 82 is opened, allowing the brewed coffee to flow into the dispensing tank 29.

Brewed beverage is delivered from the dispensing tank 29 through dispensing pipe 83. The flow of beverage through the pipe 83 is controlled by an electrically operated dispensing valve 84, as will be discussed later. Beverage flows through the dispensing pipe 83 into a cup 13 properly positioned in the access opening 12 by the jaws 21, Figure 1. Any beverage spilled from the cup 13 or leaking from the dispensing pipe 83 will be collected in the funnel 85 and flow through the pipe 86 to the waste tank 23.

Additional ingredients may be added directly to the beverage in the cup from the containers 87 and 88 which are mounted on the rear of the front panel 11, above the access opening 12. In a coffee dispenser, one container could hold a supply of granulated sugar and the other a supply of powdered cream proper quantities of which could be added to the beverage, if desired, by proper operation of the selector 15. The means by which this is done will be discussed later. It will be sufficient for the present to say that the desired powdered ingredients are delivered from the containers 87 and 88, fall through the chute means 89 and 90 into the cup 13 where they are mixed with the beverage delivered from the pipe 83.

The operation of the apparatus will now be described more fully with reference being made to the control circuit shown in Figure 4 (comprising portions 4a and 4b) which represents one embodiment of the invention. In Figures 4a and 4b, letters a to r inclusive indicate leads or wires which are connected together.

The brewing control and operating circuits which initiate and terminate the brewing cycle, effect sequential selection of the brewing pots and prevent reuse of the pots after all have been used, will be described first.

The control circuit is energized from a source of voltage, such as 110 volts A. C., through leads 93 and 94. Three fuses are provided, fuse 95 in the circuit of the heating elements, fuse 96 on one side of the control circuits and fuse 97 on the other side. The circuits are divided into two principal portions from a power standpoint, a primary portion and a secondary portion. The primary portion is connected between one line 98, which is connected to terminal 93 through normally closed overflow switch 99, and a second line 100, connected to terminal 94. The secondary portion is energized from the output windings 101b of transformer 101, the primary winding 101a of which is connected between the line 98 and the line 100 by lead p.

The brewing circuit, as has been pointed out previously, provides means for selectively or sequentially energizing each of the pot valves 26, 36, 46, 56, 66 and 76, one at a time, in accordance with the level of beverage in the storage tank means. The energization of each of the various pot valves permits heated water to flow from the tank 22 through the pipe means to the proper associated brewing pot.

An important element of the brewing circuit is a rotary selector step switch indicated generally as 104. The step switch is shown diagrammatically in the schematic drawing and as shown there includes a pair of discs 105 and 106. Spaced circumferentially about the disc 105 are a plurality of single-pole, double-throw pot valve switches 27, 37, 47, 57, 67 and 77, one for each of the pot valves. Each of the pot valve switches has a movable contact member 27a, 37a, 47a, 57a, 67a and 77a, the position of which is controlled by plunger arms 27b, 37b, 47b, 57b, 67b and 77b respectively, which contact the outer periphery of the disc 105. The switches are normally in the position shown when the apparatus is not brewing coffee. The outer edge of the disc 105 is provided with a single depression 105a into which each of the plunger arms 27b, 37b, 47b, 57b, 67b and 77b may move when the disc is in the proper position, reversing the connections made by the switch. A single-pole, double-throw switch 107 (hereinafter termed the "alternate" switch) is associated with the disc 106 and also has a plunger arm 107b which controls the position of the movable element 107a. The disc 106 is provided with six depressions 106a, 106b, 106c, 106d, 106e and 106f, into which the plunger arm 107b may move.

A switch drive motor 108 is mechanically coupled to the discs 105 and 106 and turns them in a clockwise direction as viewed in the drawings. The control circuits for the energization of the switch motor 108 will be described more fully later.

The two tanks 24 and 29 are shown diagrammatically in Figure 4a and each is provided with two measuring electrodes which form the basis of the brewing control circuits. Associated with each of these electrodes is a relay which is energized from the winding 101b of the transformer 101; these relays thus being in the secondary power control system. The winding 101b is grounded at 109, as are the two tanks 24 and 29. Thus, when there is a sufficient amount of beverage in the tanks to cover the bottoms of the various electrodes, the relay associated therewith will be energized.

In the first or measuring tank 24, the upper electrode 110 is a "brewing stop" electrode connected to the "brewing stop" relay 111. The lower electrode 114 is part of a safety control circuit and is connected to "safety" relay 115. In the second or dispensing tank 29, the upper electrode 116 is the "brewing start" electrode associated with "brewing start" relay 117; while the lower electrode 118 is connected in the circuit of "sold-out" relay 119.

For the purpose of describing the operation it will be assumed that all of the six brewing pots 25, 35, 45, 55, 65 and 75 are charged with fresh supplies of ground coffee and are ready for use, that the rotary step selector switch 104 is in the position shown in Figure 4a, that the measuring tank 24 is empty and that a sufficient quantity of beverage is present in the dispensing tank 29 to cover the bottoms of both "brewing start" electrode 116 and "sold-out" electrode 118. Under these conditions there is no energization of "brewing stop" relay 111, and its associated contact 111a is open; nor of "safety" relay 115, and its associated contact 115a is closed. "Brewing start" relay 117 is energized, as beverage covers the lower end of "brewing start" electrode 116, and its associated contact 117a is open. Similarly, "sold-out" relay 119 is energized and associated contacts 119a and 119b are closed. (The purpose of the "sold-out" circuit will be discussed later.) The various relay contacts just described are shown, in the positions described, in the drawings.

As beverage is dispensed from the machine the level of beverage in the dispensing tank 29 will fall until the bottom of the "brewing start" electrode 116 is uncovered and the brewing cycle of the apparatus is initiated. The "brewing start" electrode 116 may be adjusted vertically to cause this cycle to be initiated at any desired predetermined level of beverage, for example when 25 cups remain in the dispensing tank. If the apparatus is in a location where it is subjected to heavy demands, it might be desirable to raise the "brewing start" electrode to a position where it would be uncovered when 45 or 50 cups remain in the dispensing tank, for example.

When the level of the beverage falls below the "brewing start" electrode 116, "brewing start" relay 117 is deenergized, allowing contact 117a to close. This completes a circuit from one side of the line 98 through contact 117a, contact 115a, contact 122a of normally energized motor stop relay 122, wire m, one or more of the contacts 28b, 38b, 48b, 58b, 68b and 78b of the pot relays 28, 38, 48, 58, 68 and 78 and wire l to the step switch motor 108 and through wire c to the other side of the line 100. The circuit energizes the step switch motor 108 which in turn drives the discs 105 and 106 in a clockwise direction.

As the discs begin to turn, plunger 107b, associated with alternate switch 107, is raised out of the depression 106a, opening contact 107c and closing contact 107d. Contact 107c is in the circuit of measuring tank outlet valve 82, in pipe 81 between measuring tank 24 and dispensing tank 29. When contact 107c is closed, valve 82 is connected between one side of the line 98, and through wire p to the other side of the line 100 and the pipe connection between the tanks is open. Thus, the first thing to occur on energization of the switch motor 108 at the start of a brewing cycle is the closing of valve 82 isolating the two tanks 24 and 29. At the same time, contact 107d is closed, connecting safety valve 59 from one side of the line 98 through wire p to the other side of the line 100. Safety valve 59 is in outlet pipe 53 of the water heater 22 and must be open to allow heated water to flow to the brewing pots.

The switch motor 108 continues to drive the discs 105 and 106 until plunger 27b, associated with pot switch 27, enters depression 105a in the outer periphery of disc 105. Again, two changes in the circuit result, contact 27d being opened and contact 27c closed. Contact 27d is in the energization circuit of motor stop relay 122, which circuit is normally completed from one side of the line 98 through 27d, 37d, 47d, 67d and 77d, relay 122 and wire p to the other side of the line 100. When contact 27d is opened, this circuit is broken and relay 122 is deenergized allowing contact 122a to open, breaking the energization circuit of step switch motor 108, stopping the motor. At the same time, contact 27c closes, completing a circuit connecting pot valve 26 from one side of the line 98 through wire c to the other side of the line 100, opening the valve to allow heated water to flow through the pipe means to brewing pot 25.

Pot relay 28 is connected in parallel with pot valve 26 and is also energized when contact 27c is closed. This circuit is completed from one side of the line 98 through contact 27c, wire k, relay 28 and wire 123. The pot relays 28, 38, 48, 58, 68 and 78 are of the manual reset type; that is, after they have once been energized they must be manually tripped to return them to deenergized position.

At this stage of the brewing cycle the valve 82 between measuring tank 24 and dispensing tank 29 is closed and heated water flows from the tank 22 through the various brewing pot 25. Inside the pot 25, the heated water is pipe means by virtue of the supply pressure to the sealed sprayed over the ground coffee and forced under pressure to percolate downward therethrough. The resulting infusion, filtered as heretofore described, passes through the pot outlet pipe 70 into measuring tank 24. This continues until the level of beverage in the measuring tank 24 reaches the bottom of "brewing stop" electrode 110. The position of "brewing stop" electrode in the measuring tank may be adjusted to a predetermined level properly related to the amount of ground coffee placed in the brewing pots and the brewing pressure used.

When the level of beverage reaches "brewing stop" electrode 110, brewing stop relay 111 is energized closing contact 111a, associated therewith. A circuit is completed from one side of the line 98 through contact 107d of alternate switch 107, contact 111a, step switch motor 108 and wire c to the other side of the line 100, energizing switch motor 108. Switch motor 108 will again drive the discs 105 and 106 in a clockwise direction, moving the plunger 27b out of depression 105a, opening contact 27c and closing contact 27d. When contact 27c is opened, pot valve 26 is deenergized, stopping the flow of water to brewing pot 25. When contact 27d is closed motor stop relay 122 is again energized closing contact 122a and returning the "brewing start" circuit to stand-by condition.

Switch motor 108 continues to turn until plunger 107b of alternate switch 107 enters depression 106b in the outer periphery of disc 106. At this time, contact 107d is opened breaking the energizing circuit for the step switch motor 108, stopping the motor and deenergizing safety valve 59. Safety valve 59 will prevent any flow of heated water through the pipe means in the event of a malfunction or a failure of pot valve 26. At the same time, contact 107c is closed completing the energizing circuit for valve 82 from one side of the line 98 through wire p to the other side of the line 100. When this valve is energized, the pipe connection between measuring tank 24 and dispensing tank 29 is opened allowing the freshly brewed beverage to flow into the heated dispensing tank 29.

Coffee may now be dispensed as desired from tank 29 until the level thereof again falls below the bottom of electrode 116 at which time the brewing cycle will be repeated using the next brewing pot 35. "Brewing start" relay 117 is deenergized closing contact 117a and completing the energizing circuit for switch motor 108. The motor again drives the discs 105 and 106 in a clockwise direction opening contact 107c of the alternate switch 107 to deenergize and close valve 82 while closing contact 107d to open safety valve 59. As the discs continue to turn, plunger 37b moves into the depression 105a in disc 105 opening contact 37d in the step switch motor circuit and closing contact 37c to energize pot valve 36 and pot relay 38. At the end of the brewing cycle, "brewing stop" relay 111 again becomes energized closing contact 111a and energizing switch motor 108. The discs 105 and 106 are again turned in a clockwise direction opening contact 37c to deenergize and close pot valve 36 and closing contact 37d to again place the "brewing start" circuit in stand-by condition. The motor continues to turn until plunger 107b enters depression 106c stopping the motor and opening valve 82.

Safety electrode 114 is provided in measuring tank 24 to prevent a brewing cycle from commencing if for some reason beverage remains in the measuring tank 24. Electrode 114 is connected in the circuit of safety relay 115, and whenever the electrode is covered contact 115a associated with the relay is opened, breaking the brewing start motor energization circuit. This safety circuit prevents the initiation of a second brewing cycle immediately after the first and before the freshly brewed coffee has an opportunity to flow into the dispensing tank 29. It also prevents the initiation of a brewing cycle if, due to same malfunction of the machine, a quantity of beverage remains in the measuring tank.

The pot relays 28, 38, 48, 58, 68 and 78 serve two functions. First, each has a contact 28b, 38b, 48b, 58b, 68b and 78b in the "brewing start" motor energization circuit. As has been mentioned previously, these relays are of the manually reset type and once each has been energized, the contacts associated therewith will remain open until the relays have been manually reset. Each relay is connected in parallel with its associated pot valve and is energized at the same time as the pot valve. That is, as discussed above, when pot valve 26 was energized permitting brewing in pot 25, pot relay 28 was energized and when pot valve 36 was energized permitting brewing in pot 35, pot relay 38 was energized. Thus, as each of the brewing pots is used, the associated pot relay is energized and contacts 28b, 38b, 48b, 58b, 68b and 78b which are connected in parallel in the brewing start motor energization circuit are opened. After all of the brewing pots have been used, all of these contacts will be open, preventing further energization of the switch motor 108.

Similarly, contacts 28a, 38a, 48a, 58a, 68a and 78a are each opened when the respective pot relays are energized: these contacts are connected in the circuits of indicator lights 28c, 38c, 48c, 58c, 68c and 78c respectively. The indicator light circuit is completed from one side of the line 98 through wire q, the switches and the indicator lights to the other side of the line 100. Thus, initially all six of the indicator lights are burning. As each of the various brewing pots is used, the indicator light associated therewith will be deenergized providing a visual indication to the serviceman as to which brewing pots should be replaced.

"Sold-out" electrode 118 is positioned very close to the bottom of dispensing tank 29 so that it becomes uncovered only when substantially all of the coffee has been withdrawn from the dispensing tank. This will generally occur only when all of the brewing pots have been used, although the dispensing tank may be emptied during the brewing process. Normally, as "sold-out" electrode 118 will be covered with liquid, "sold-out" relay 119 will be energized through wire o, and contacts 119a and 119b associated therewith will be closed. Contact 119a is in the energization circuit for heater element 124 associated with dispensing tank 29. This circuit is completed from terminal 93 through fuse 95, manual switch 125, contact 119a, thermostatic control switch 126 and heater element 124 to the other side of the line 100. In normal operation thermostatic switch 126 will control the heating element 124 to maintain the coffee in the dispensing or warming tank 29 at the proper temperature. When the dispensing tank is empty, however, it is desirable to prevent further energization of heater 124.

Contact 119b, which is also opened when "sold-out" relay 119 is deenergized, is in the energizing circuit of disabling relay 127, associated with the dispensing circuit. As will appear more fully later, disabling relay 127 must be energized before the dispensing operation can take place. When "sold-out" relay 119 is deenergized, contact 119c is closed lighting "sold-out" light 128 which indicates to prospective customers that the machine is not in condition for dispensing drinks. This light is energized from one side of the line 98 through wire b and contact 119c.

Also in the energizing circuit of disabling relay 127 is "cup empty" switch 129 which is associated with the cup supply in such a manner that so long as there are cups remaining, contact 129a will be closed, while when the cup supply is exhausted contact 129a will be opened and 129b will be closed. The circuit of the disabling relay 127 is completed from one side of the line 98 through wire b, contact 119b, contact 129a through the relay and through wire 130 to the other side of the line 100. If the cup supply should become exhausted contact 129a will be opened deenergizing the disabling relay 127 and closing contact 129b lighting "sold-out" light 128. Thus, when either the coffee supply or the cup supply is exhausted, disabling relay 127 will be deenergized.

Heating element 131 is associated with water heating tank 22 and is energized by a circuit from terminal 93 through fuse 95, manual switch 134, thermostatic control switch 135, pressure operated switch 60 and the heater element to the other side of the line 100. Normally, the thermostatically controlled switch 135 will control the operation of the heating element 131 in such a manner that the temperature and the pressure within the tank 22 do not become excessive. In the event of a failure of this switch however, a mechanical relief valve 49 responsive to both temperature and pressure is provided. Should this safety also fail, pressure operated switch 60 is provided for deenergizing the heating element.

The dispensing cycle control circuits will next be described. These circuits are designed to operate upon the insertion of a suitable coin or token in the coin slot 14 on the front panel 11 of the machine and to cause delivery of a cup 13 and a suitable quantity of beverage and cream or sugar, if desired, to the cup. As has been pointed out, disabling relay 127 is energized so long as an adequate supply of beverage and cups remains. Accordingly, contacts 127a and 127b are normally closed, as shown in the drawings.

Single-pole, double-throw coin switch 136 is normally biased in the upward position, as shown in solid lines in the drawing, closing contact 136a. At this time cup motor relay 137 is deenergized and contact 137b associated therewith is closed as shown. Coin reject magnet 138 is normally energized by a circuit from one side of the line 98 through wire b, wire 139, contact 142a of cup motor switch 142, contact 137b, contact 127b through the magnet to the other side of the line 100. Normally, the coin reject magnet, which may be of any suitable design, will be energized and will allow suitable coins or tokens to pass through the coin chute to the coin switch 136. If for any reason there is a failure of power, the coin reject magnet 138 will be deenergized and should a prospective customer insert a coin in the coin slot it will be returned through the coin return opening 18a.

Assuming that a suitable coin has been deposited in the machine, it will pass the coin reject magnet 138 and will strike coin switch 136 moving it to the dotted line position shown in the drawings in which contact 136a is opened and contact 136b is closed. A circuit will be completed from terminal 93 through fuse 96, wire r, contact 136b, cup motor relay 137 and wire 130 to the other side of the line 100, energizing cup motor relay 137. Energization of cup motor relay 137 closes contact 137a, completing a holding circuit from one side of the line 98 through wire b, wire 139, contact 142a of the cup motor switch 142, contact 137a, relay 137 and wire 130 to the other side of the line 100, maintaining the relay energized. At the same time contact 137b is opened, deenergizing coin reject magnet 138 thereby preventing further coins from impinging on coin switch 136 during the dispensing operation. Contact 137c which is in the energization circuit of cup motor 143 is also closed on energization of cup motor relay 137.

After coin switch 136 has been operated to the dotted line position momentarily by the action of a coin, it will return to the solid line position shown in the drawings closing contact 136a. A circuit is then completed from terminal 93 through fuse 96, wire r, contact 136a, contact 127a, contact 137c, cup motor 143 and wire 130 to the other side of the line, energizing cup motor 143. Cup motor 143, in addition to operating the cup dispensing mechanism, not shown, is connected through a speed reducing mechanism 144 to four cams: cam 142d, associated with cup motor switch 142; cam 145a, associated with coffee dispensing switch 145; and cams 146a and 147a associated with cream and sugar switches 146 and 147 respectively (see Figure 5).

Assuming that the prospective customer has adjusted the selector 15 for black coffee, cream and sugar selector switches 148 and 149 respectively will be open as shown in the drawings. When a proper coin is inserted, cup motor relay 137 and cup motor 143 will be energized as previously described and the motor will begin to turn, driving the associated cams in a counterclockwise direction. As the cams turn, coffee dispensing switch 145 will be closed by cam 145a energizing dispensing valve 84, allowing coffee to flow through dispensing pipe 83 to cup 13. At the same time counter mechanism 151 is actuated registering the number of cups of beverage dispensed. The circuit for these operations is completed from one side of the line 98 through wire b, wire 139, switch 145 and valve and counter mechanism back to the other side of the line 100. A short time after coffee dispensing switch 145 is closed, cream and sugar dispensing switches 146 and 147 will be closed by their respective cams 146a and 146b. However, as neither cream nor sugar were selected by the setting of the selector 15, the closing of switches 146 and 147 has no effect on the circuit.

After a predetermined period of time, coffee dispensing switch 145 is opened by cam 145a deenergizing and closing coffee dispensing valve 84. A short time thereafter, contact 142a of cup motor switch 142 is opened by the operation of cam 142c and contact 142b is closed. Contact 142a is in the circuit of holding contact 137a of cup motor relay 137 and when it is opened, cup motor relay 137 is denergized. This breaks the main energizing circuit for cup motor 143. However, at the time contact 142a is opened, contact 142b is closed by operation of cam 142c and this contact completes an energizing circuit for cup motor 143 from one side of the line 98 through wire b, wire 139, contact 142b, cup motor 143 and wire 130 back to the other side of the line 100. Thus, cup motor 143 continues to run for a short period of time until cam 142c opens contact 142b and closes contact 142a, returning the circuit to its original condition.

Should the customer of the machine desire to have cream or sugar added to the coffee dispensed by the machine, proper operation of the selector 15 will close either or both switches 148 and 149, associated with the cream and sugar dispensing circuits respectively. For example, if both cream and sugar are desired, both switches 148 and 149 will be closed. Then, during the portion of the dispensing cycle in which switches 146 and 147 are closed by their respective cams 146a and 147a, cream motor 152 and sugar motor 153 will be energized. The circuit for each of these controls is substantially the same and is completed from one side of the line 98 through wire b, wire 139, selector switch 148 or 149, and dispensing switches 146 and 147 respectively through the motors to the other side of the line 100. The dispensing motors 152 and 153 drive suitable means for ejecting a quantity of powdered ingredient from the containers 87 and 88 whereby it may fall through the chute means 89 and 90 into cup 13 as previously described.

Waste tank 23, Figure 2, is positioned to receive overflow, condensation and leakage from the various elements of the apparatus. In particular, liquid accumulating in drip pan 32 at the bottom of cabinet 31, overflow from dispensing tank 29, leakage or spillage in the dispensing operation and overflow from relief valve 49 will accumulate in waste tank 23.

Under ordinary operating conditions only a small quantity of liquid should enter the waste tank. However, in the event of a serious malfunction such as a jammed dispensing valve 84, or excessive pressure or temperature within the water heating tank 22 sufficient to cause operation of the relief valve 49, a large quantity of liquid will enter the waste tank. It is desirable to provide some means for shutting down operation of the machine if for some reason the level of waste liquid in tank 23 exceeds a certain predetermined level. A ball float 154 is pivotally mounted on the tank and carries a normally closed mercury switch 99. Should the level of waste liquid in the tank reach the predetermined maximum, waste tank switch 99 will be opened deenergizing both the brewing and the disabling relay 127 preventing further operation (either brewing or dispensing) of the machine. In addition, coin reject magnet 138 will be deenergized in order that any coins deposited by customers will be returned.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a beverage dispensing device utilizing a heated liquid as a constituent of the beverage, apparatus of the character described for providing the heated liquid, comprising: a source of liquid; a tank connected to said source of liquid and adapted to receive liquid therefrom; electrically operated means for heating said tank and the liquid therein; a thermostatic control switch responsive to the temperature of said liquid for controlling the operation of said heating means, said heating means being deenergized when the temperature of said liquid reaches a predetermined point; a relief valve associated with said tank and responsive to the temperature and pressure therein, for venting said tank when either the temperature or the pressure therein reaches a predetermined point, said last mentioned predetermined temperature being higher than the predetermined temperature controlling said thermostat; and a pressure control switch responsive to the pressure of said liquid for controlling the operation of said heating means, said heating means being deenergized when the pressure of said liquid reaches a predetermined point, said last mentioned predetermined pressure being higher than the predetermined pressure controlling said relief valve.

2. In a beverage dispensing device utilizing a heated liquid as a constituent of the beverage, apparatus of the character described for providing the heated liquid, comprising: a source of liquid; a tank connected to said source of liquid and adapted to receive liquid therefrom; an electrical heating element operably associated with said tank for heating the liquid therein; a circuit, including a source of electrical energy connected with said heating element; a first switch in said circuit and having a thermostatic control element operably associated with said tank and responsive to the temperature of said liquid for controlling energization of said heating means, the switch being opened, breaking said circuit when the temperature of said liquid reaches a predetermined point; a relief valve associated with said tank and responsive to the temperature and pressure therein for venting the tank when either the temperature or pressure reaches a predetermined point, said last mentioned temperature being higher than the predetermined temperature controlling said first switch; and a second switch in said circuit and having a pressure control element responsive to the pressure of said liquid for opening said second switch and breaking said circuit when the pressure of the liquid reaches a predetermined point, said last mentioned predetermined pressure being higher than the predetermined pressure controlling the relief valve.

References Cited in the file of this patent

UNITED STATES PATENTS

| | | |
|---|---|---|
| 1,329,712 | Johnson | Feb. 3, 1920 |
| 1,437,119 | Speck | Nov. 28, 1922 |
| 1,621,620 | Bast | Mar. 22, 1927 |
| 1,776,539 | Calleson | Sept. 23, 1930 |
| 1,805,159 | Bauer et al. | May 12, 1931 |
| 1,822,433 | Brand | Sept. 8, 1931 |
| 1,869,720 | Strand et al. | Aug. 2, 1932 |
| 2,268,633 | Aske | Jan. 6, 1942 |
| 2,340,070 | McCauley et al. | Jan. 25, 1944 |
| 2,433,054 | Lime | Dec. 23, 1947 |
| 2,488,817 | Kaminky | Nov. 22, 1949 |
| 2,565,235 | Johnson | Aug. 21, 1951 |
| 2,568,840 | Zees | Sept. 25, 1951 |
| 2,569,486 | Mills | Oct. 2, 1951 |
| 2,614,738 | Mills | Oct. 21, 1952 |
| 2,706,444 | Chaplik | Apr. 19, 1955 |

FOREIGN PATENTS

| | | |
|---|---|---|
| 271,525 | Great Britain | Sept. 24, 1928 |
| 593,547 | France | May 29, 1925 |

UNITED STATES PATENT OFFICE

CERTIFICATE OF CORRECTION

Patent No. 2,813,965

November 19, 1957

Leslie Arnett

It is hereby certified that error appears in the printed specification of the above numbered patent requiring correction and that the said Letters Patent should read as corrected below.

Column 6, line 30, strike out "brewing pot 25. Inside the pot 25, the heated water is" and insert the same after "to the sealed" in line 31, same column; column 9, line 58, for "denergized" read -- deenergized --.

Signed and sealed this 28th day of January 1958.

(SEAL)
Attest:
KARL H. AXLINE
Attesting Officer

ROBERT C. WATSON
Commissioner of Patents